May 6, 1958
H. J. SIERADZKI
AUTOMATIC POWER CUT-OFF SYSTEM FOR AIRCRAFT CONTROL SURFACES
Filed July 22, 1955
2,834,010
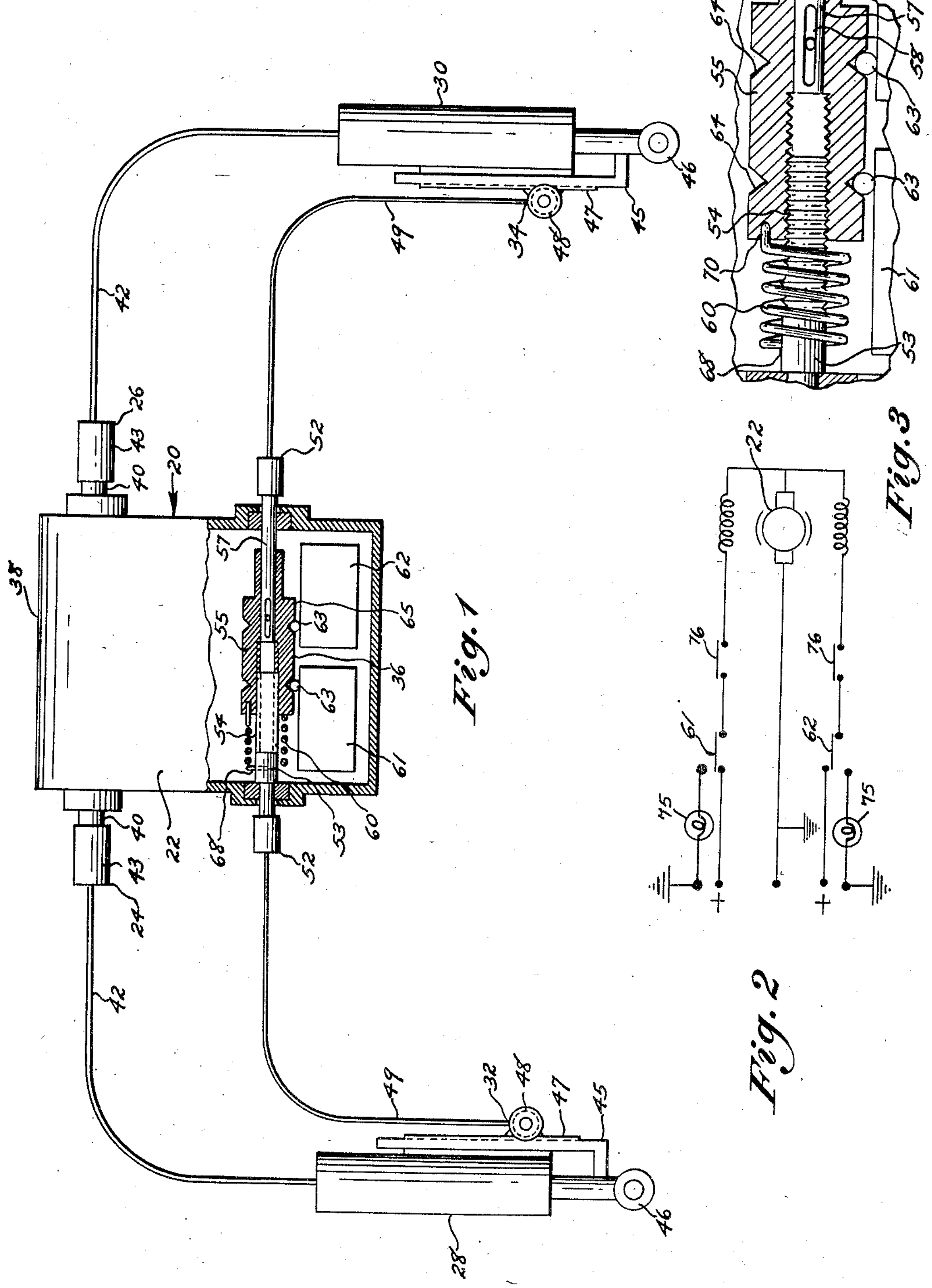

United States Patent Office 2,834,010

Patented May 6, 1958

2,834,010

AUTOMATIC POWER CUT-OFF SYSTEM FOR AIRCRAFT CONTROL SURFACES

Henry J. Sieradzki, Garden City, N. Y., assignor to Lundy Manufacturing Corporation, Long Island City, N. Y., a corporation of New York Application July 22, 1955, Serial No. 523,788

6 Claims. (Cl. 340—268)

This invention relates generally to the field of aircraft, and more particularly to an improved form of power cut-off system for controlling electrically operated control surfaces.

In certain aircraft applications where there are remotely located linear screw jacks driven from a single power source, it is necessary, from a standpoint of safety, that the extension of the screw jacks be not allowed to get out of synchronization within certain predetermined limits. In particular, in an aircraft having wing flaps, one on each side of the center line of the aircraft, during either a take-off or a landing when the flaps are being retracted or extended and a mechanical failure occurs on one side of the system, and only the opposite wing flap moves, the aircraft would perform a violent and probably unrecoverable maneuver. In some aircraft, this problem has been partially solved by the use of hydraulic systems wherein a failure anywhere in the line would permit all of the fluid to leak from the lines, thus preventing movement of either of the flaps. In other aircraft, flaps are controlled, however, by the direct electromechanical drive of a flexible cable operating the abovementioned linear screw jacks, and such incidental protection is not available.

It is therefore among the principal objects of the present invention to provide an automatic cut-off system which will interrupt the operation of the prime mover driving the flexible cables to the linear screw jacks upon the mechanical failure of any part of the system.

Another object of the invention lies in the provision of an automatic cut-off system for aircraft use of the class described, in which mechanical means are used to open an electrical switch through which power to the prime mover passes, thereby immediately stopping the prime mover from further driving of the control surfaces irrespective of the present position of those surfaces with respect to the wings.

Another object of the invention lies in the provision of an automatic cut-off system for use in conjunction with mechanically driven screw jacks which may comprise a relatively few number of moving parts, thus permitting relatively low manufacturing costs, a long, trouble-free durable service life, and easy serviceability from the standpoint of maintenance.

A feature of the invention lies in the fact that many of the components comprising the cut-off system may be positioned adjacent the power unit or prime mover, permitting both these components and the prime mover to be removed from the aircraft simultaneously for servicing, if desired.

These objects and features, as well as other incidental ends and advantages, will become more clearly apparent during the course of the following disclosure, and be pointed out in the appended claims.

On the drawing, to which reference will be made in the specification, similar reference characters have been employed to designate corresponding parts throughout the several views.

Figure 1 is a schematic diagram showing an embodiment of the invention.

Figure 2 is a schematic wiring diagram of the power unit, which comprises a part of the embodiment.

Figure 3 is an enlarged sectional view showing the lower central portion of Figure 1.

In accordance with the invention, the device, generally indicated by reference character 20, comprises broadly: a power unit 22, left-hand power transmission means 24, right-hand power transmission means 26, a left-hand screw jack element 28, a right-hand screw jack element 30, a left-hand cut-off driving element 32, a right-hand cut-off driving element 34, and a power unit cut-off element 36.

The power unit 22 may be of any conventional design, well known in the art, preferably mounted within a housing 38 suitably located within the fuselage of the aircraft (not shown). A pair of driven output shafts 40 are connected to the prime mover through suitable gearing (not shown).

The left and right-hand power transmission means 24 and 26 are substantially similar, each including a flexible cable or shaft 42 having anchor means 43 for interconnecting the same with the output shafts 40.

The screw jack elements 28 and 30 are also similar, and in addition to the internal screw mechanism for operating the same, each jack includes an arm 45 on the movable portion 46 of the jack element, the arm having a rack member 47 thereon. A small pinion 48, supported from the frame of the jack, in driven by the rack member, the pinion being mounted on the end of a flexible cable or shaft 49. The cables 49 are interconnected by couplings 52 to the power unit cut-off element 36.

The element 36 includes a screw shaft 53 rotationally driven by the left-hand cut-off driving element 32 and an internally threaded nut member 55 driven by the right-hand cut-off driving element 34. Key means 58 permits axial movement of the nut member 55 with respect to the shaft 57 upon which it is mounted, while maintaining rotational immobility with respect thereto. The screw shaft 53 engages the nut member 55 by thread means 54, and in addition, a preloaded coil spring 60 is connected to portions of the screw shaft and nut member at points 68 and 70, respectively.

Disposed adjacent the nut member 55 are a pair of switches 61 and 62 of a composite type including projecting actuators 63 which lie within annular grooves 64 in the outer surface 65 of the nut member 55.

During operation of the power unit, movement through the cables 42 operates the jack elements 28 and 30 at a uniform rate, motion being transmitted through the rack members 47, the pinions 48 and cables 49 to the cut-off element 36. Since during normal operation the left and right-hand cut-off driving elements 32 and 34 are operating at equal speed, the screw shaft 53 and nut member 54 rotate at the same time and through the same annular displacement. The nut member therefore rotates without axial displacement, the projecting actuators 63 being undisturbed as the outer surface 65 moves therepast. Should a failure occur in either cut-off driving element, the threaded interconnection between the screw shaft 53 and the nut member 55 will result in axial displacement of the nut member 55, wherein the projecting actuators 63 will be contacted by the side surfaces of the grooves 64, thereby tripping both switches. In the event that the failure which occurs is of such a nature that it affords less torsional friction to the cut-off element 36 than the normal static friction existing between the screw shaft 53 and the nut member 55, the torsion spring 60 will cause relative movement therebetween, to assure necessary axial displacement of the nut member 55.

Referring to Figure 2 of the drawing, switches 61 and 62 are preferably of the double throw type wherein the depression of the actuators 63 result in the interruption of one circuit and the simultaneous making of another circuit. The other circuit may be utilized in conjunction with a light on the pilot's instrument panel 75 to forewarn him of flap system failure. The switches 61 and 62 are independent of the conventional limit switches 76 which interrupt the flow of current in either direction when the jack elements 28 and 30 have reached the limits of their respective paths of travel.

It may thus be seen that I have invented novel and highly useful improvements in automatic cut-off systems for use in conjunction with aircraft wing flap control mechanisms wherein the flaps may be principally operated by cable driven linear screw jacks which in turn drive a mechanical linkage adapted to interrupt the flow of power operating the flaps in the event of a mechanical failure to one of the jacks being driven without a corresponding failure in another. The system will operate irrespective of where the particular failure occurs, and structure is included for the overcoming of normal static frictional forces within the cut-off system, if the failure is of such a nature that it does not provide sufficient friction to permit relative axial movement of the parts. Owing to the simplicity of the cut-off system, it may be incorporated in relatively smaller aircraft using cable driven flap actuating systems, and with a negligible increase in the weight of the aircraft.

I wish it to be understood that I do not consider the invention limited to the exact details of structure shown and set forth in this specification, for obvious modifications will occur to those skilled in the art to which the present invention pertains.

I claim:

1. An aircraft control surface operating mechanism comprising: a power unit, first and second power transmission means associated with said power unit; first and second screw jack elements associated with said first and second power transmission means, respectively, and motion output means capable of rotational movement corresponding to the linear extension of said jack elements; and means for interrupting the operation of said power unit upon the failure of said screw jack elements to extend and contract simultaneously; said means including an internally threaded nut member driven by the motion output means of one screw jack element and a screw shaft driven by the other of said motion output means; said screw shaft and nut member being threadedly engaged; and switch means actuated by the axial movement of said nut member with respect to said screw shaft for interrupting the operation of said power unit.

2. An aircraft control surface operating mechanism comprising: a power unit, first and second power transmission means associated with said power unit; first and second screw jack elements associated with said first and second power transmission means, respectively, and motion output means capable of rotational movement corresponding to the linear extension of said jack elements; and means for interrupting the operation of said power unit upon the failure of said screw jack elements to extend and contract simultaneously; said means including an internally threaded nut member driven by the motion output means of one screw jack element and a screw shaft driven by the other of said motion output means; said screw shaft and nut members being threadedly engaged; switch means actuated by the axial movement of said nut member with respect to said screw shaft for interrupting the operation of said power unit; and resilient means for overcoming static friction between said nut member and screw shaft.

3. An aircraft control surface operating mechanism comprising: a power unit, first and second power transmission means associated with said power unit; first and second screw jack elements associated with said first and second power transmission means, respectively, and motion output means capable of rotational movement corresponding to the linear extension of said jack elements; and means for interrupting the operation of said power unit upon the failure of said screw jack elements to extend and contract simultaneously; said means including an internally threaded nut member driven by the motion output means of one screw jack element and a screw shaft driven by the other of said motion output means; said screw shaft and nut members being threadedly engaged; switch means actuated by the axial movement of said nut member with respect to said screw shaft for interrupting the operation of said power unit; and alarm means actuated by said switch means simultaneously with the interruption of operation of said power unit.

4. In an aircraft control surface operating mechanism including a power unit, first and second power transmission means associated with said power unit, first and second screw jack element associated with said first and second power transmission means, respectively, the improvement comprising means for interrupting the operation of said power unit upon the failure of said first and second screw jack elements to extend and contract simultaneously, said means comprising motion output means capable of rotational movement corresponding to the linear extension and contraction of said jack elements, an internally threaded nut member driven by the motion output means of one screw jack element, and a screw shaft driven by the other of said motion output means; said screw shaft and nut member being threadedly engaged; and switch means actuated by the axial movement of said nut member with respect to said screw shaft for interrupting the operation of said power unit.

5. In an aircraft control surface operating mechanism including a power unit, first and second power transmission means associated with said power unit, first and second screw jack element associated with said first and second power transmission means, respectively, the improvement comprising means for interrupting the operation of said power unit upon the failure of said first and second screw jack elements to extend and contract simultaneously, said means comprising motion output means capable of rotational movement corresponding to the linear extension and contraction of said jack elements, an internally threaded nut member driven by the motion output means of one screw jack element, and a screw shaft driven by the other of said motion output means; said screw shaft and nut member being threadedly engaged; switch means actuated by the axial movement of said nut member with respect to said screw shaft for interrupting the operation of said power unit; and resilient means for overcoming static friction between said nut member and screw shaft.

6. In an aircraft control surface operating mechanism including a power unit, first and second power transmission means associated with said power unit, first and second screw jack element associated with said first and second power transmission means, respectively, the improvement comprising means for interrupting the operation of said power unit upon the failure of said first and second screw jack elements to extend and contract simultaneously, said means comprising motion output means capable of rotational movement corresponding to the linear extension and contraction of said jack element, an internally threaded nut member driven by the motion output means of one screw jack element, and a screw shaft driven by the other of said motion output means; said screw shaft and nut member being threadedly engaged; switch means actuated by the axial movement of said nut member with respect to said screw shaft for interrupting the operation of said power unit; and alarm means actuated by said switch means simultaneously with the interruption of operation of said power unit.

References Cited in the file of this patent

UNITED STATES PATENTS

| | | |
|---|---|---|
| 1,675,062 | Smoot | June 26, 1928 |
| 2,232,752 | Wilson | Feb. 25, 1941 |